(12) United States Patent
Alcon

(10) Patent No.: US 10,767,269 B2
(45) Date of Patent: Sep. 8, 2020

(54) ELECTROLYSIS DEVICE

(71) Applicant: Andrew R Alcon, Fort Worth, TX (US)

(72) Inventor: Andrew R Alcon, Fort Worth, TX (US)

(73) Assignee: Vital Tech, LLC, Cheyenne, WY (US)

( * ) Notice: Subject to any disclaimer, the term of this patent is extended or adjusted under 35 U.S.C. 154(b) by 295 days.

(21) Appl. No.: 15/932,989

(22) Filed: Jun. 6, 2018

(65) Prior Publication Data

US 2018/0371627 A1 Dec. 27, 2018

Related U.S. Application Data

(60) Provisional application No. 62/604,033, filed on Jun. 21, 2017.

(51) Int. Cl.
| | |
|---|---|
| C25B 9/04 | (2006.01) |
| C25B 9/18 | (2006.01) |
| C25B 1/04 | (2006.01) |
| C25B 15/02 | (2006.01) |
| C25B 1/06 | (2006.01) |

(52) U.S. Cl.
CPC .............. *C25B 9/04* (2013.01); *C25B 1/04* (2013.01); *C25B 1/06* (2013.01); *C25B 9/18* (2013.01); *C25B 15/02* (2013.01); *F05B 2220/61* (2013.01); *F17C 2221/012* (2013.01)

(58) Field of Classification Search
None
See application file for complete search history.

(56) References Cited

U.S. PATENT DOCUMENTS

| | | | | |
|---|---|---|---|---|
| 4,206,029 A | * | 6/1980 | Spirig | C25B 1/06 204/228.1 |
| 5,711,865 A | * | 1/1998 | Caesar | C25B 1/04 204/228.2 |
| 5,993,749 A | * | 11/1999 | Adams | A61L 2/10 422/186.3 |
| 6,972,077 B2 | * | 12/2005 | Tipton | C02F 1/463 204/269 |
| 7,199,482 B2 | | 4/2007 | Hopewell | |
| 7,352,074 B1 | | 4/2008 | Pas | |
| 7,911,071 B2 | | 3/2011 | Devine | |
| 8,203,225 B2 | | 6/2012 | Devine | |
| 8,415,814 B2 | | 4/2013 | Devine | |
| 8,575,770 B2 | | 11/2013 | Devine | |
| 8,852,410 B1 | * | 10/2014 | Turgeon | C25B 15/02 204/267 |
| 2002/0074237 A1 | * | 6/2002 | Takesako | C02F 1/4672 205/628 |

(Continued)

*Primary Examiner* — Harry D Wilkins, III
(74) *Attorney, Agent, or Firm* — Randal Homburg

(57) ABSTRACT

An improved electrolysis system is disclosed in which the tank is designed to operate with a plurality of electrodes that are connected in a parallel plate configuration to a DC power source. The electrode geometry provides a means in which the height of the electrodes is lessened by increasing the length of the electrodes to provide the necessary area for any given current input. The lessened height of the electrode reduces the travel path of the gases escaping to the surface thereby reducing the void fracture height area of the bubbles and increasing the overall system efficiency. Additional efficiencies are obtained with a high surface area of contact between the electrical bus segments and the electrodes.

9 Claims, 12 Drawing Sheets

(56) References Cited

U.S. PATENT DOCUMENTS

| | | | |
|---|---|---|---|
| 2010/0089676 A1* | 4/2010 | Papachristopoulos | C25B 9/00 180/69.4 |
| 2010/0089746 A1* | 4/2010 | Chang | H01M 8/0234 204/269 |
| 2010/0180837 A1* | 7/2010 | High | F02M 25/12 123/3 |
| 2010/0258450 A1* | 10/2010 | Burtch | C25B 1/02 205/639 |
| 2011/0057455 A1* | 3/2011 | Russo | C25B 1/04 290/1 A |
| 2011/0253070 A1* | 10/2011 | Haring | C25B 1/04 123/3 |
| 2012/0234265 A1* | 9/2012 | Ball | F02B 43/10 123/3 |
| 2015/0136591 A1* | 5/2015 | Fraim | C25B 9/06 204/289 |
| 2015/0159284 A1* | 6/2015 | Packer | C25B 15/08 204/274 |
| 2017/0107635 A1* | 4/2017 | Haring | C25B 15/08 |
| 2017/0107899 A1* | 4/2017 | Haring | C25B 1/04 |
| 2019/0201813 A1* | 7/2019 | Frisky | B03B 1/00 |

* cited by examiner

PRIOR ART

PRIOR ART

ELECTROLYSIS DEVICE

CROSS REFERENCE TO RELATED APPLICATIONS

Applicant claims the benefit of Provisional Patent Application No. 62/604,033, filed on Jun. 21, 2017, by the same inventor.

BACKGROUND OF THE INVENTION

1. Field of Invention

An improved electrolysis system is disclosed in which the tank is designed to operate with a plurality of electrodes that are connected in a parallel plate configuration to a DC power source. The electrode geometry provides a means in which the height of the electrodes is lessened by increasing the length of the electrodes to provide the necessary area for any given current input. The lessened height of the electrode reduces the travel path of the gases escaping to the surface thereby reducing the void fracture height area of the bubbles and increasing the overall system efficiency. Additional efficiencies are obtained with a high surface area of contact between the electrical bus segments and the electrodes.

2. Description of Prior Art

A preliminary review of prior art patents was conducted by the applicant which reveal prior art patents in a similar field or having similar use. However, the prior art inventions do not disclose the same or similar elements as the present electrolysis device, nor do they present the material components in a manner contemplated or anticipated in the prior art.

In all four prior art patents to Devine, including U.S. Pat. Nos. 8,575,770, 8,415,814, 8,203,225 and 7,911,071, a generic "electrolyzer" is referenced as the generating source for hydrogen production in a wind powered desalination and hydrogen production system. However, the specific components of the electrolyzer are not disclosed. The function and character of an appropriate electrolyzer are disclosed, but the elements comprising and defining the nature and scope of the electrolyzer are not. There are no claims directed to an electrolysis device within those four patents to Devine.

In U.S. Pat. No. 7,352,074 to Pas, a floating hydrogen production device is disclosed having a "decomposition apparatus", presumably the same as an electrolysis device, which uses generated electricity to convert water into hydrogen and oxygen. It is also not disclosed other than by function, and no claims are directed to the decomposition apparatus to ascertain its components and elements. A system for using wind power to create electricity to operate an electrolyzer system is disclosed, once again referencing a generic electrolyzer system as opposed to the elements and operative components of the electrolyzer itself.

The present electrolysis device is based upon a parallel unipolar electrode arrangement with a laminated bus bar assembly attaching to the anode array and a separate bus bar assembly attaching to the cathode array, with a plurality of power cable attaching respectively to each bus bar assembly to distribute an even amount of electrical energy to each respective bus bar assembly. It also deals with a dry cell electrolysis tank defining a lower water inlet and a pair of segregated gas outlet fittings.

One prior art patent, U.S. Pat. No. 8,147,661 to Moon, defines an electrolysis unit which defines the electrolysis device contained between a first and second lateral wall with a water inlet for receiving water from a reservoir and a gas outlet for the electrolysis produced gases to be directed. Those unipolar electrolysis device found in the prior art do not employ these elements or features in their disclosed embodiments although capable of generating hydrogen and oxygen from water using unipolar electrodes. In U.S. Pat. No. 3,983,026 to Cabaraux, a unipolar electrolytic cell is disclosed which features alternating vertical anodes attaching to an independent base plate receiving current, the anode extending upward into cathode pockets. An electrolysis cell having metal anodes and metal cathodes connected together back to back by metal to metal contacts forming a bimetallic partition, each anode and cathode being presented in wave form with their active surfaces intermeshed together is disclosed in U.S. Pat. Nos. 4,161,438, 4,059,495 and 3,930,980, all to De Nora. These also perform an electrolysis process, but the elements do not comprise those elements and components of the present electrolysis device which is the subject of the disclosure and claims herein.

The primary reason that most commercial electrolyzers use a series configured design over a parallel configured system is that the large current consumption of a parallel configured system requires very large bus bars to keep the electrical resistance low. The transforming and rectification process necessary to provide the power for a large scale parallel electrolyzer offsets the energy savings that such a system could otherwise provide.

There are several means to overcome and bypass the limitations of transforming and rectifying power to produce very high amounts of electric current to a parallel (unipolar) electrolyzer. One means is provided by the use of a homopolar generator. A homopolar generator is a DC electrical generator comprising an electrically conductive disc or cylinder rotating in a plane perpendicular to a uniform static magnetic field. A homopolar generator is capable of producing very high DC electric currents at low voltages without the need of commutation or rectification. It can be powered from the rotation of a prime mover such as a wind turbine, hydro powered turbine, tidal powered turbine or an electric motor.

Another means is the use of lithium ion battery packs arranged in a series/parallel configuration to deliver a fixed power requirement to the tank based upon its design parameters. The lithium ion batteries can be charged by solar power, hydro power turbines, wind turbines, or tidal powered. Additional means of power can be provided to the electrolyzer through the use of low voltage, high capacity ultra capacitors. The ultra capacitors can also be charged by solar power, hydro power turbines, wind turbines, or tidal powered turbines.

SUMMARY OF THE INVENTION

Presently the world relies on fossil fuels as the main source of its energy needs with the primary sources of fossil fuels being oil, natural gas and coal. The use of these fuel sources has a number of negative consequences including environmental pollution, regional availability, the vulnerability to disruption, and a finite supply of these materials.

Hydrogen is the fuel that will ultimately replace fossil fuels as the world's primary source for its energy needs. However there are significant efforts which must be made to transition the world away from oil and coal based fuels to a hydrogen-based fuel economy. Significant improvements in hydrogen production, distribution, and storage must be made to make this transition economically viable. Hydrogen is considered an energy carrier because it takes energy to separate it from the other elements in its compound state. Currently the most cost effective way of producing hydrogen is by removing it from hydrocarbons through a process known as steam reforming. Steam reforming splits a hydrocarbon molecule into carbon oxides from hydrogen gases by a process which uses high temperature (1,290-1,800 F) steam in the presence of a nickel catalyst. Although steam reforming is a cost effective way of producing hydrogen, it still is dependent upon the use of a fossil fuel to produce hydrogen. The logical alternative to steam reforming of hydrocarbons is the electrolysis of water.

The electrolysis of water is simply a means of breaking the hydrogen and oxygen bond of a water molecule by passing a direct electric current between two or more electrodes immersed in water. An electrolyte such as potassium hydroxide is usually added to the water to increase conductivity and increase productivity of hydrogen and oxygen gasses. This process will attract the positive hydrogen ions to the negative (cathode) plate and the negative oxygen ions to the positive (anode) plate. The gas bubbles rise to the top of the plates where they are either burned as an oxyhydrogen gas or the tank can be designed to separate the gasses at the anode and cathode plates with a membrane material such as asbestos or other common materials used for this process. The separated gasses are collected and stored for later uses. Many tank designs require that the tank be placed under pressure to reduce the gas bubble size to increase the efficiency and allow for a shorter period of time for the gas to escape to the top of the electrode.

Water is the most abundant substance on earth covering about 70% of the earth's surface, however only about 4% of the annual supply of hydrogen is produced through the electrolysis of water. The primary limitation to producing large volumes of hydrogen through water electrolysis is the massive amounts of electrical energy required to accomplish this process. There has been a considerable amount of research devoted to minimizing the amount of electrical energy needed to produce hydrogen through the electrolysis of water.

Most of the large commercial electrolyzers are designed to produce hydrogen through a series (bipolar) configuration. The series configuration uses cells which share an electrode with the next cell. Each electrode has a positive and negative side. The total voltage input into the electrolyzer is divided by the number of cells in the unit. If a bipolar electrolyzer has 50 cells which require an operating voltage of 2 volts each, then the input voltage has to be 100 volts. The current consumed for the entire electrolyzer is the same as the current consumption for any one cell.

The typical bipolar electrolyzer provides each electrode having a positive and negative side. The positive side serves as the anode and the negative side serves as the cathode. The voltage needed for a series electrolyzer is determined by the voltage needed for each cell multiplied by the number of cells in the unit. The amperage consumed by a series electrolyzer is the same as the amperage consumption for each individual cell. Most of the large commercial electrolyzers are designed to operate using a series (BIPOLAR) configuration. The primary reasons they favor a series configuration over a parallel configuration is that the AC to DC rectification is more efficient at higher voltages by avoiding very large transformers and rectifiers that would be necessary to provide very high amperages at low operating voltages.

The present electrolyzer is a parallel (unipolar) electrolyzer. In a parallel (unipolar) electrolyzer, each anode is connected separately to the positive terminal of the power source and each cathode is connected in a similar fashion to the negative terminal of the power source. The voltage requirement for the entire unit is equal to that of one cell. The current required for the unit is the multiple of the current needed by each cell.

Faraday's Laws of Electrolysis provide that in any electrolysis process, the mass of the substance liberated at the anode or cathode is in accordance with the formula: $m=zq$, where: m is the mass of the substance liberated in grams, z is the electrochemical equivalent of the substance, and q is the quantity of electricity passed in coulombs. A very important consequence of Faraday's Law is that the rate decomposition of an electrolyte is dependant on current and independent of voltage beyond the minimal voltage for the process to take place.

Michael Faraday determined that 1 square inch of plate surface can efficiently distribute 0.54 amperes of electric current. One (1) ampere, distributed across two adjacent plates, can produce 0.0003689 Cubic Feet/Minute of HHO gas. That translates into 0.01044 liters/Minute (LPM) of HHO per amp of electricity delivered efficiently to the electrodes. The hydrogen side needs one square inch and the oxygen side needs one square inch.

An advantage of a parallel electrolyzer over the series electrolyzer is that the current efficiencies with a parallel electrolyzer can approach 100%. Another advantage of the parallel electrolyzer is that less energy is wasted by avoiding the higher operating voltages that are required by the series electrolyzer.

The additional benefit of the high surface area of contact between the electrodes and the electrical bus of the tank is that the heat provided by the high current densities of the parallel configuration increases the electrical efficiency of the system by decreasing the overall operating voltage. If electrolysis is carried out at a high temperature the minimum voltage required for the process decreases. This can effectively allow the electrolyzer to operate at more than 100% electrical efficiency. In electrochemical systems, this means that heat must be supplied to the reactor to sustain the reaction. In this way, thermal energy can be used as part of the electrolysis energy requirement.

DESCRIPTION OF THE PREFERRED EMBODIMENT

Figure 1:
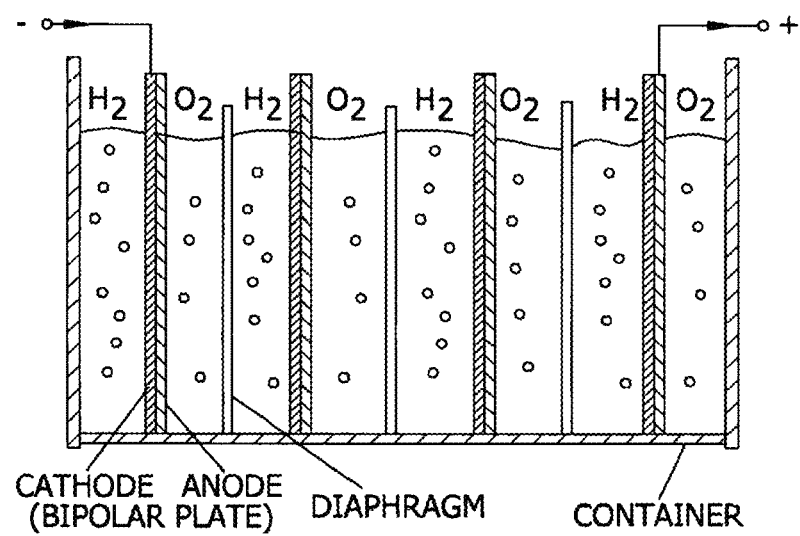
FIG. 1 is an illustration of a series bipolar electrolyzer with each cell sharing an electrode with the next cell.
Figure 2:
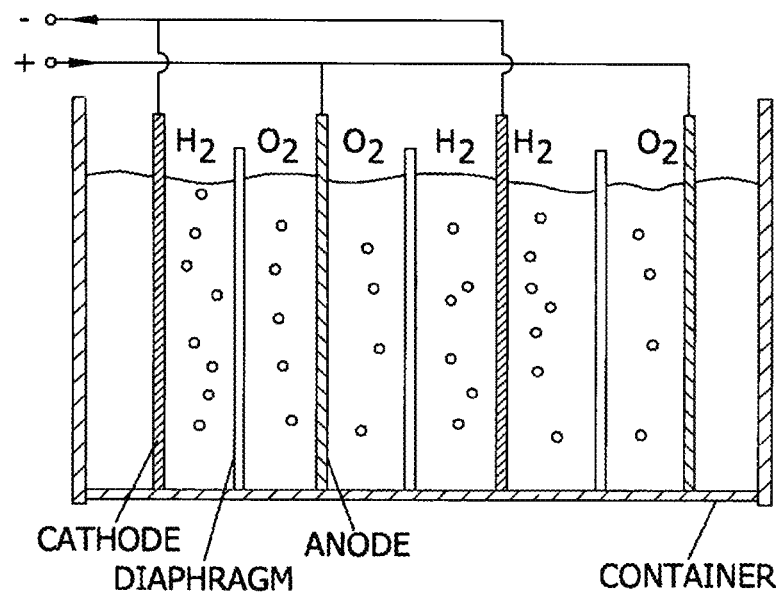
FIG. 2 is an illustration of the parallel unipolar electroyzer.

A unipolar electrolysis apparatus 10, shown in FIGS. 2-11, generating combustible hydrogen and oxygen from the electrolysis of water, operating with a plurality of anode plates 22 and a plurality of cathode plates 32 forming an electrode plate assembly 20 provided by alternating a cathode plate 22 and an anode plate 32 separated by a gasket 40 throughout the electrode plate assembly 20. Each anode plate 22 and each cathode plate 32 define respective extended areas 28, 38 which extends from the electrode plate assembly 20 leaving a space between cathode plates 32 and a space between anode plates 22. A positive bus bar 60a and a negative bus bar 60b are formed by an assembly of laminated sheets which extend from each positive bus bar 60a and negative bus bar 60b with a space defined between each laminated plate wherein each individual anode plate 22 and cathode plate 32 being parallel and separated by a gasket 40 insert their respective extending void fracture areas 26, 36, integrating with spaces between the laminated metal sheets formed by each respective positive and negative bus bar 60a, 60b, the bus bars further attaching to a plurality of electrical power cables 50 transferring DC positive power from the positive bus bar 60a to the anode plates 22 and DC negative power from the negative bus bar 60b to the cathode plates 32 providing electrical current to each plurality of anodes and electrical current to each plurality of cathodes in water or water circulating within an enclosed dry cell tank 80, thereby generating oxygen and hydrogen from the water and directing the hydrogen and oxygen to a respective outer storage vessel. It is preferred that the power supply be rendered by a homopolar electrical generator 100.

Example Prototype

Figure 5:
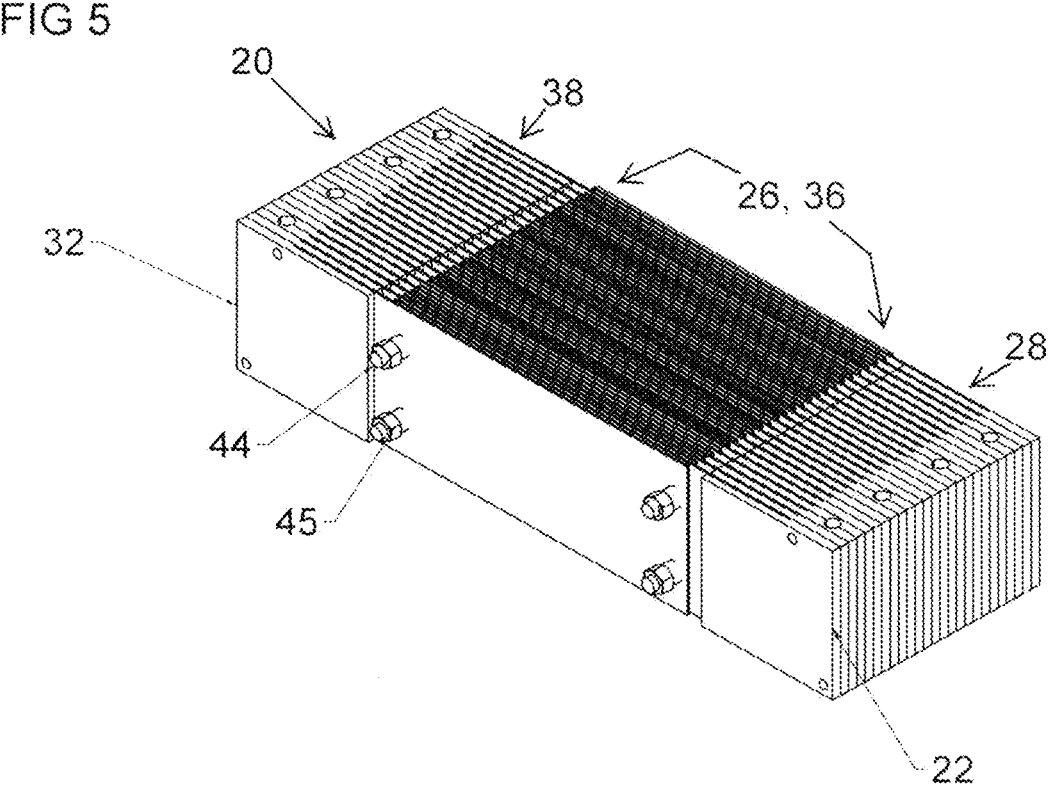
FIG. 5 is a perspective view of the electrode plate assembly with the plates alternatively flipped horizontally with gaskets placed between each plate.

A prototype apparatus was designed and constructed in accordance to the present invention. The prototype consisted of 50 stainless steel electrode plates. Each plate had a dimension of 4 inches in height and 12 inches in length with a thickness of 0.059 inches. Half of the plates functioned as the anode and the other half functioned as the cathode. The plates were assembled as shown in FIG. 5.

Figure 9:
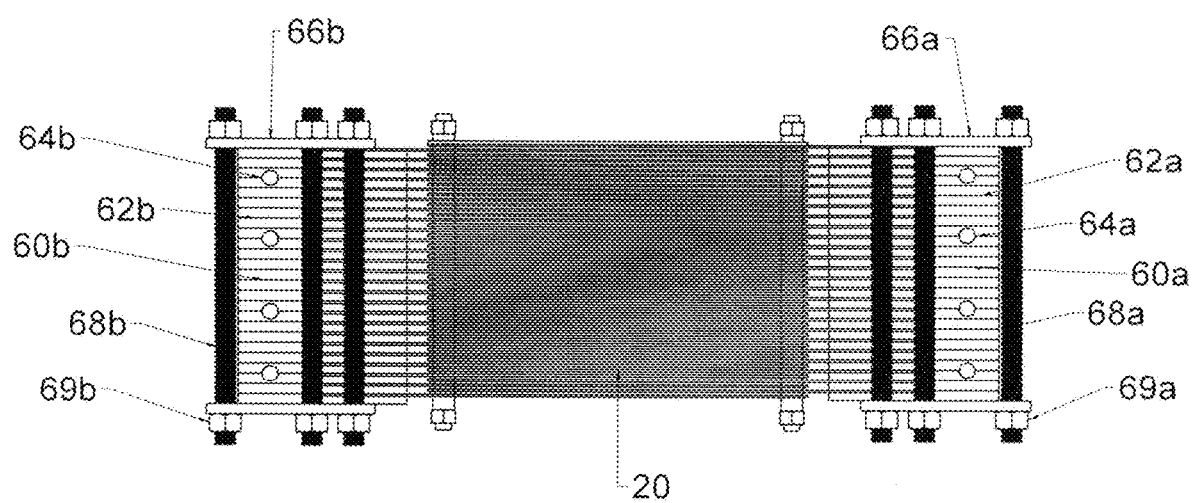
FIG. 9 is a top view of FIG. 7.

Of the 50 laminated sheets comprising each bus bar segment, 25 bus bar segments were integrated with the corresponding anode plates 22 on one side of the tank and the other 25 bus bar segments were connected to the corresponding cathode plates 32 on the opposite side of the tank as illustrated in FIG. 9. The each laminated sheet 62a, 62b, comprising the bus bars 60a, 60b, had a dimension of 4 inches high by 4 inches long and 0.250 inches thick. The segments were machined to a depth of 0.059 inches to match the thickness of the electrode plate which would slip in between the assembled laminated sheets comprising each bus bar segment. The machined area of the bus bar segment totaled 10 square inches which was the height of the bus bar segment of 4 inches by the length of the segment that was machined which was 2.5 inches. This machined area allowed us an efficient area of contact to transfer the electrical and thermal energy coming from the bus bar assembly to the electrodes of the tank. The remaining part of the bus bars were not machined which left an area of 1.5 inches long by 4 inches high by 0.250 inches thick. A select number of bus bar segments were machined vertically through the height so that a hole is formed between two segments to allow a bolt to connect the power cable from the power source to the tank. The electrolyte was a mixture of water and 25% of Potassium Hydroxide. At this concentration of KOH and water, the boiling point of water is elevated to approximately 230 degrees F. Several tests were performed wherein the tank was powered at approximately 1,030 amps. The voltage in the first segment at that amperage level shows 1.969 volts@128 F. In the next segment at that current level, the voltage has dropped to 1.957 volts@134 F. In the final voltage reading the voltage dropped to 1.946 volts@139 F. These tests show a stable linear pattern of a 0.011 voltage drop for every 5 degree increase of heat at the electrode plates. If the temperature were to increase by 90 degrees Fahrenheit from 139 F to 229 F the voltage would read 1.792 volts while delivering 1,030 amps to the tank.

Bipolar Electroyzer Tank—Prior Art

The bipolar electroyzer tank present used in the prior art for large scale production of hydrogen and oxygen is shown in FIG. 1. In this device, each electrode has a positive and negative side. The positive side serves as the anode and the negative side serves as the cathode. The voltage needed for a series electrolyzer is determined by the voltage need for each cell multiplied by the number of cells in the unit. Amperage consumed by a series electrolyzer is the same as the amperage consumed for each individual cell. Presently most large commercial electrolyzers are designed to operate using this series bipolar configuration, because the favor a series configuration over a parallel configuration because the AC to DC rectification is more efficient at high voltages by avoiding very large transformers and rectifiers that would be necessary to provide very high amperages and low operating voltages. The primary reason that most commercial electrolyzers use a series configured design over a parallel configured system is that the large current consumption of a parallel configured system requires very large bus bars to keep the electrical resistance low. The transforming and rectification process necessary to provide the power for a large scale parallel electrolyzer offsets the energy savings that such a system could otherwise provide.

Advantages of a Unipolar Electrolysis Apparatus Using Homopolar Generator

There are several means to overcome and bypass the limitations of transforming and rectifying power to produce very high amounts of electric current to a parallel (unipolar) electrolyzer. One means is provided by the use of a homopolar generator, FIG. 3. A homopolar generator 100 is a DC electrical generator comprising an electrically conductive disc or cylinder rotating in a plane perpendicular to a uniform static magnetic field. Additionally, a homopolar generator is capable of producing very high DC electric currents at low voltages without the need of commutation or rectification. It can be powered from the rotation of a prime mover such as a wind turbine, hydro powered turbine, tidal powered turbine or an electric motor. Another means is the use of lithium ion battery packs arranged in a series/parallel configuration to deliver a fixed power requirement to the tank based upon its design parameters. The lithium ion batteries can be charged by solar power, hydro power turbines, wind turbines, or tidal powered turbines. Additional means of power can be provided to the electrolyzer through the use of low voltage, high capacity ultra capacitors. The ultra capacitors can also be charged by solar power, hydro power turbines, wind turbines, or tidal powered turbine. The benefit of the unipolar electrolysis tank with each electrode directly connected to the power source—half connected to the anode (positive side) and the other half connected to the cathode (negative side)—of the power source. The advantage of a parallel electrolyzer tank is that higher current densities are possible resulting in current efficiencies approaching 100%.

An additional benefit of the parallel configured tank is that the heat provided by the high current densities of a parallel configuration increases the electrical efficiency of the system. If electrolysis is carried out at a high temperature the minimum voltage required for the process decreases. This can effectively allow the electrolyzer to operate at more than 100% electrical efficiency. In electrochemical systems, this means that heat must be supplied to the reactor to sustain the reaction. In this way, thermal energy can be used as part of the electrolysis energy requirement. The electrolysis of water under standard conditions requires a theoretical minimum of 237 kJ of electrical energy input to dissociate each mole of water which is the standard Gibbs free energy of formation of water. Gibbs free energy represents the minimum work necessary for the reaction to proceed. The reaction enthalpy is the amount of energy in both work and heat that has to be provided so that the reaction products are at the temperature as the reactant. Potentially, an electrolyzer operating at 1.48 volts would be 100% efficient.

The Homopolar Generator

Figure 3:
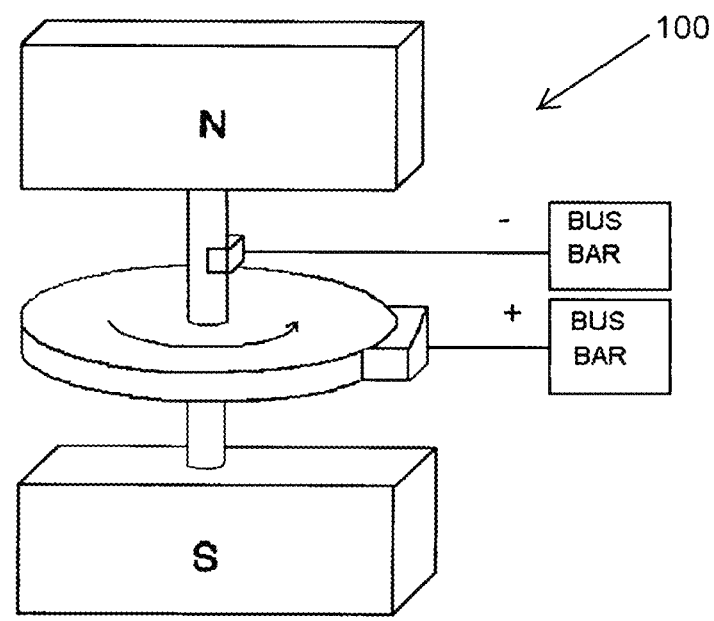
FIG. 3 is an illustration of a homopolar generator providing pure DC power to the parallel unipolar electrolysis tank bus.

A homopolar power supply, a/k/a homopolar electrical generator 100, FIG. 3, is a DC electrical generator comprising an electrically conductive disc or cylinder rotating in a plane perpendicular to a uniform static magnetic field. The homopolar generator is the only electrical machine that can produce a pure DC output without the use of a commutation. The electromotive force generated in the rotating disk is fundamentally due to the Lorentz force on the electrons in the moving conductor placed in a magnetic field. The electrons move with the initial angular velocity ($\omega$) of the conductor with a radius of $\textcircled{R}$ and in the presence of a magnetic field (B). The electric field due to the Lorenz force acting on an electron can be expressed as: $E=(\omega \times r) \times B$, where (E) is the induced electric field. The electrons are moved to the rim of the disk and an electromotive force is generated between the rim and axis of the disk.

A homopolar generator can use either a permanent magnet to provide its magnetic field or a coil made from a superconducting wire cooled to its critical temperature to generate its magnetic field. The most powerful superconductors used for magnetic field coils will use either a Niobium Titanium (NbTi) alloy or Niobium Tin alloy (Nb3Sn) as the wire material for the production of extremely high magnetic fields. These materials are normally cooled with liquid helium in a cryostat to reach their critical temperature. A highly efficient homopolar generator would be provided with a magnetic field produced by a superconducting coil for its power generation. Additionally, the brushes which transfer the energy from the homopolar generator through connecting cables or solid bus bars to the electrolysis tank can use either a silver metal fiber material or a liquid metal alloy in a specially designed reservoir for the electrical power transfer. A liquid Sodium-Potassium alloy known as (NaK78) has shown to be a highly efficient means to transfer electrical energy from the homopolar generator to the load. A properly designed homopolar generator can produce in excess of 100,000 amperes of electric current at 20 volts or less. The use of the homopolar generator adds additional efficiency for the electrolysis process by precisely controlling the amount of power to the tank through regulating the rotational speed of the generator.

Unipolar Electrolysis Apparatus

Returning back now to the unipolar electrolysis apparatus 10, FIGS. 4-11, the electrode plates further comprise two electrode plate assembly 20 which define the plurality of anode plates 22 having an extended area 28 containing attachment holes 24 and a void fracture area 26, the plurality of cathode plates 32 having an extended area 38 containing attachment holes 34 and a void fracture area 36, gaskets 40 inserted between each cathode plate 32 and a gasket 40 between each anode plate 22, insulated tubes 42 inserted through respective aligned holes 24 in each of the plurality of aligned anode plates 22, insulated tubes 42 inserted through aligned holes 34 in each of the plurality of aligned cathode plates 32, threaded rods 44 inserted through each insulated tubes 42, and tension nuts 45 inserted on opposing ends of the threaded rods 44 to retain the aligned cathode plates 32 and gaskets 40 together and on opposing ends of the threaded rods 42 to retain the aligned anode plates 22 together with uniform and even spacing between each individual anode plate 22 and between each individual cathode plate 32.

Figure 4:
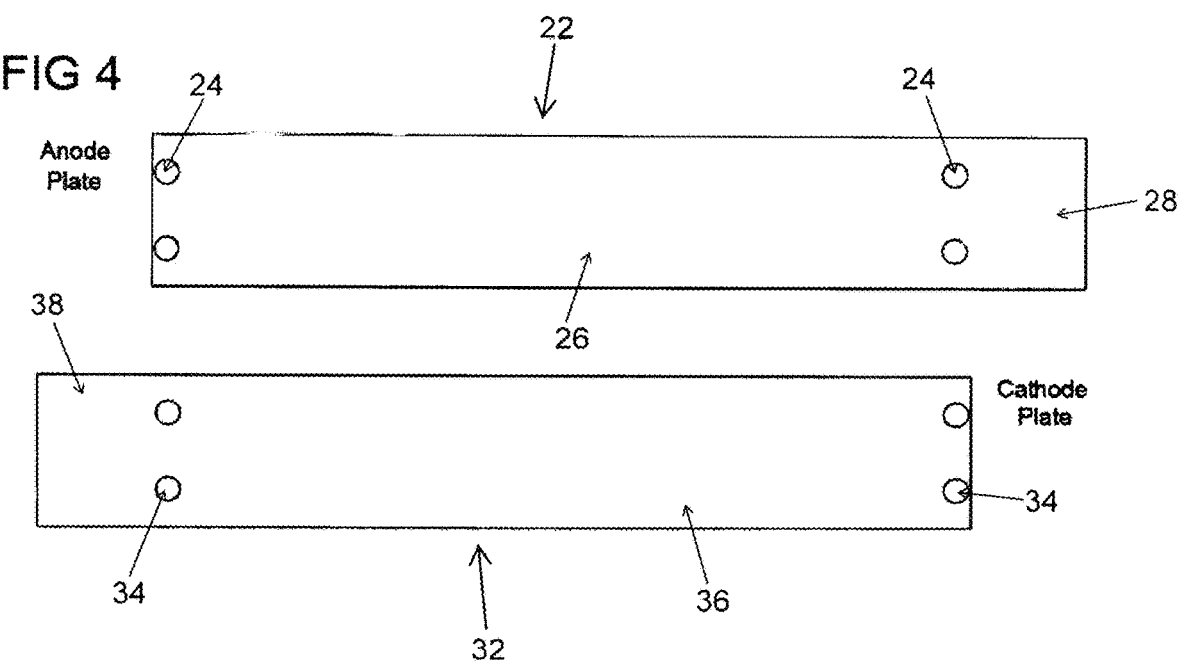
FIG. 4 is a side view of each anode plate and cathode plate in a preferred geometry with the placement of the holes aligned for gasket placement and attachment to the respective electrical bus bars.

FIG. 4 is an illustration of the preferred electrode plate geometry with hole patterns that allow the plates to be horizontally flipped and aligned for gasket placement with holes to match the pattern of the plates. The gaskets 40 will be placed in between the individual plates to provide spacing between the plates, FIG. 6. The plates are alternately flipped horizontally to form an extended area on either side to integrate each electrical bus bar 60a, 60b, to each of the respective electrode plate assemblies 20, also shown in FIG. 6 The actual area on the plates where the electrolysis process takes place is between the two holes on the left side of the plate and the two holes on the right side of the plate, FIGS. 4-5. The area between the plates where the electrolysis process takes place is known as the void fracture area 26, 36, FIG. 5. The void fracture area 26, 36, is defined by the area that the gas bubbles are formed on the plates and between the plates. The gas bubbles impede the electrolysis process by acting as a barrier or insulator as they are formed on the plates until they are released to flow to the surface. The preferred geometry for the electrodes provides plates that are shorter in height and longer in length to allow a shorter travel distance for the gas bubbles to reach the top of the plate. The system efficiency is increased by reducing the travel distance (and time) for the bubbles to evacuate the void fracture area and reach the surface of the tank.

FIG. 5 is a perspective view of the electrode plates assemblies 20 from the detailed description reference from FIG. 4. The plates shown in FIG. 5 are alternately flipped horizontally are lined up with gaskets placed between the plates. The gaskets 40 are situated between each electrode plate 22, 32. The attachment holes 24, 34, in the plates provide a means to insert a high temperature, electrically insulated tubes 42 through the plates. The threaded rod 44 which is the length of the electrode stack is placed through each of the insulated tubes 42 and the tension nuts 45 with an electrically insulating washer is tightened on either end of the threaded rods 44 of each electrode stack. The electrode plate assembly 20 is configured in a pattern which allows the copper or aluminum bus bar segments comprising each bus bar 60a, 60b, to be configured to slip fit between the gaps of each electrode plate assembly 20.

Figure 7:
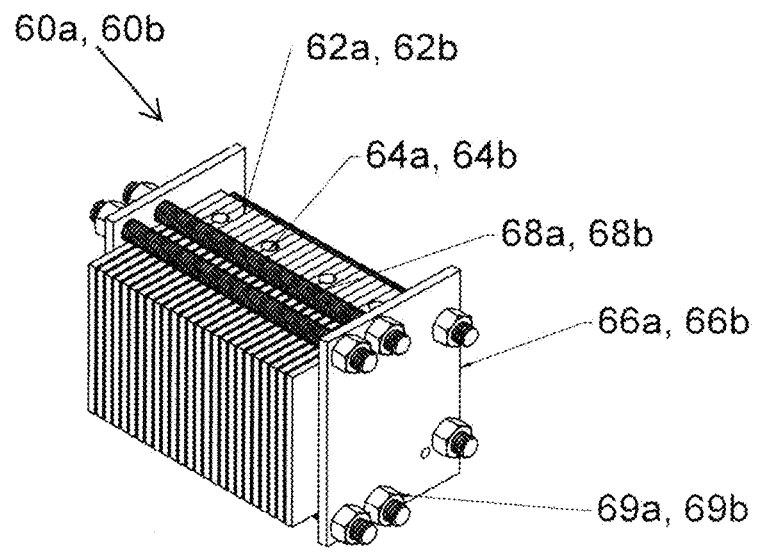
FIG. 7 is a perspective view of a bus bar design formed with laminated sheets providing holes to bolt the electrical cables onto the bus bars.

Each bus bar 60a, 60b, FIG. 7, is formed from the plurality of uniform laminated sheets 62a, 62b, further including end brackets 66a, 66b, which are held together by tensioning rods 68a, 68b, which run outside the plurality of laminated sheets 62a, 62b, the rods 68a, 68b, held at a uniform tension together while maintaining a tight surface area connection between the bus bar and each respective electrode plate assembly, providing for efficient transfer of electrical and thermal energy between each bus bar 60a, 60b, and its inserted electrode plate assembly 20. A series of cable bores 64a, 64b, are drilled within each bus bar 60a, 60b, for the further attachment of electrical power cables 50 independently attaching to each bus bar 60a, 60b, from the (homopolar) DC power source or generator 100.

Figure 6:
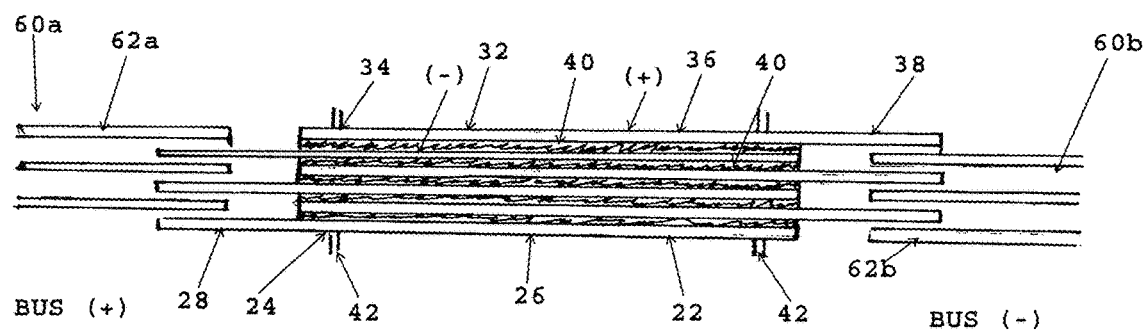
FIG. 6 is an isolation view of the electrode plate assembly and bus bars integrating with the electrode plate assembly.
Figure 8:
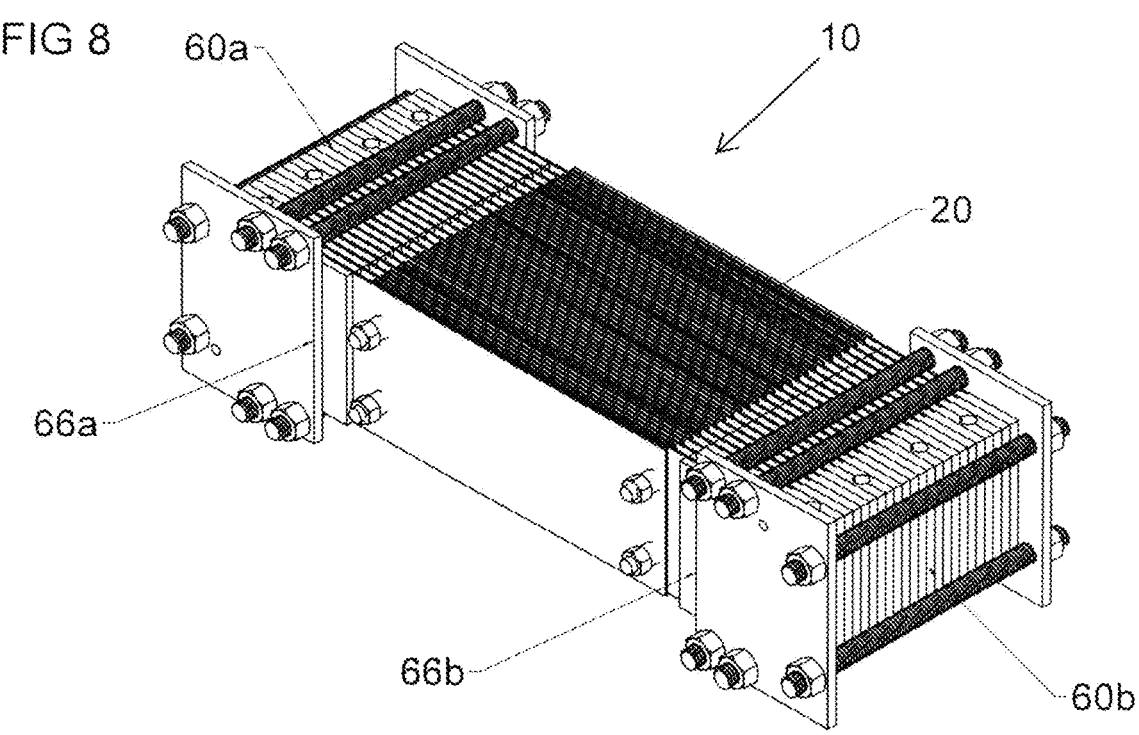
FIG. 8 is a perspective view of the bus bar assembly integrated with the electrode assembly.

As seen in FIG. 6, 8-9, the bus bars 60a, 60b, the anode plates 22 and cathode plates 32 form a connection between the respective laminate plate 62a, 62b, and the respective cathode plate 32 or respective anode plate 22. The tensioning rods 68a, 68b, of each bus bar 60a, 60b, allow the tension to vary through loosening and tightening the tensioning nuts 69a, 69b, to accommodate the connecting of the bus bars 60a, 60b, to the electrodes and firmly secure the entire electrolysis apparatus 10 together. The flexibility of this apparatus allows for a design that can efficiently transfer very high electrical amperages evenly throughout the tank and also allow for a greater control of the thermal energy transfer to the system. Further advantages of this apparatus allows for adding additional electrodes and bus bar laminates for additional power input without building a completely new system. FIG. 9 is a top view of each bus bar 60a, 60b, connected to each electrode plate assembly 20 as it was described and seen in the commentary of FIG. 4-6. The plate thickness and gasket thickness can vary from 1 mm to 3 mm depending upon the calculations of the optimal spacing between the electrodes and the optimum thickness for current and heat transfer for the electrolysis process.

Figure 10:
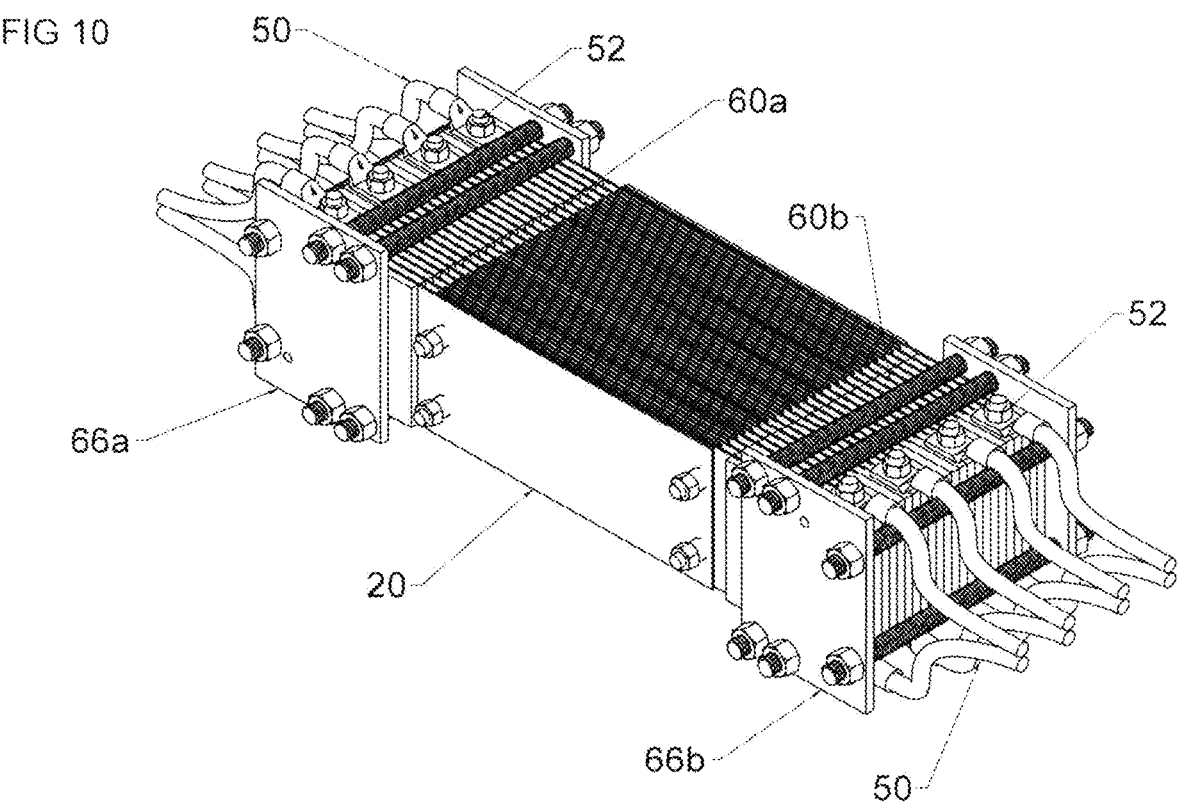
FIG. 10 is a perspective view of the bus bar and electrode assembly with the electrical power cables connected to the bus bar in an evenly spaced arrangement along the length of the bus bar.

FIG. 10 is a perspective view of the bus bar 60a, 60b and electrode plate assemblies 20 with the electrical power cables 50 connected to the bus bar 60a, 60b, in an evenly spaced arrangement along the length of the bus bar. The electrical power cables 50 are connected to each bus bar 60a, 60b, through a cable bolt 52 which passes through the respective cable bores 64a, 64b, of each bus bar 60a, 60b, to allow the electrical power to be evenly displaced along the length of each bus bar 60a, 60b.

Dry Cell Embodiment

Figure 11:
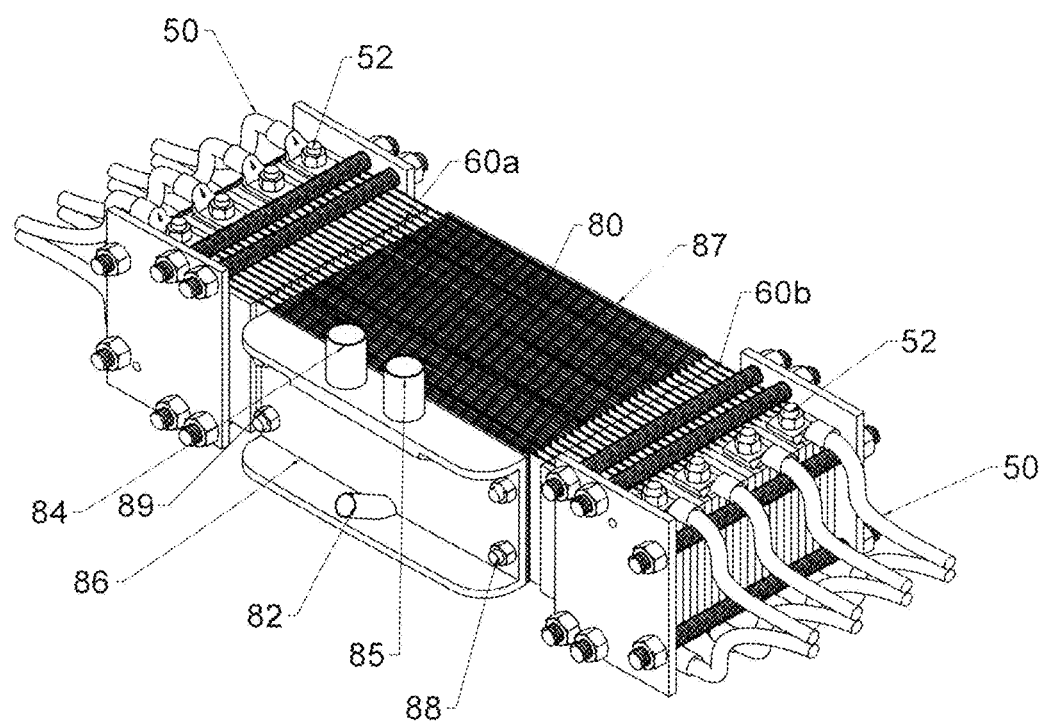
FIG. 11 is a perspective view of a dry cell electrolyzer according to the current parallel unipolar electrolyzer with water flowing into the tank through the water inlet fitting located at the bottom of the assembly with the generated gasses separated through a membrane and evacuated into an area located above the active electrodes of the tank directed to respective storage vessels.

A dry cell embodiment of the unipolar electrolysis apparatus 10 is shown in FIG. 11. This dry cell 80 contains the water which is electrolyzed within the system and defines a face plate 86 having a water inlet 82, a hydrogen outlet 84, an oxygen outlet 85 and an end plate 87 further held together by another set of tensioning rods 88 and nuts 89. The dry cell 80 would be water-tight and gas-tight and be provided to fully contain the water resultant gasses. In this regard, there may be some type of water sealant or gasket applied to the dry cell assembly to prevent water from leaking at the face plate 86, end plate 87, outlets 84, 85, and inlet 82. The hydrogen outlet 84 and oxygen outlet 85 are further connected to respective line, not shown, to usher the generated hydrogen gas to an outer vessel and the generated oxygen to a separate outer vessel for storage. The dry cell 80 allows water to flow into the tank through the water inlet 82. The electrode plate assemblies 20 are formed in a fashion in which water passes under the electrode plate assemblies 20 and bus bars 60a, 60b, and the gasses generated by the electrolysis reaction are separated through a membrane and are evacuated into an area located above the active electrode plate assemblies 20 contained within the dry cell 80 to exit the dry cell into their respective storage vessels. The configuration of the dry cell contents is the same as the configuration of the electrode plate assemblies 20 and bus bars 60a, 60b, as disclosed in the earlier descriptions seen in FIG. 3. As represented in FIGS. 4-5, the hole patterns of the plates allow every other plate to be flipped horizontally from the previous plate to align the pattern for the assembly. Just like the embodiment of the "open cell", utilized in FIGS. 2-10, each plate is electrically insulated from the next plate by a gasket which separates the plates from one another and seals the water inside the plates.

The primary advantage of the dry cell 80 configuration is that the water pressure feeding the tank from the bottom, aids in rapidly moving the gasses to the top of the electrode assembly and evacuate the tank for storage. The dry cell is connected to the bus bar assemblies in the same manner as in the previous descriptions. The connecting cables from the bus bars are connected to the corresponding bus terminals of the homopolar generator 100.

Energy Source for the Bipolar Electrolysis Apparatus

Figure 12:
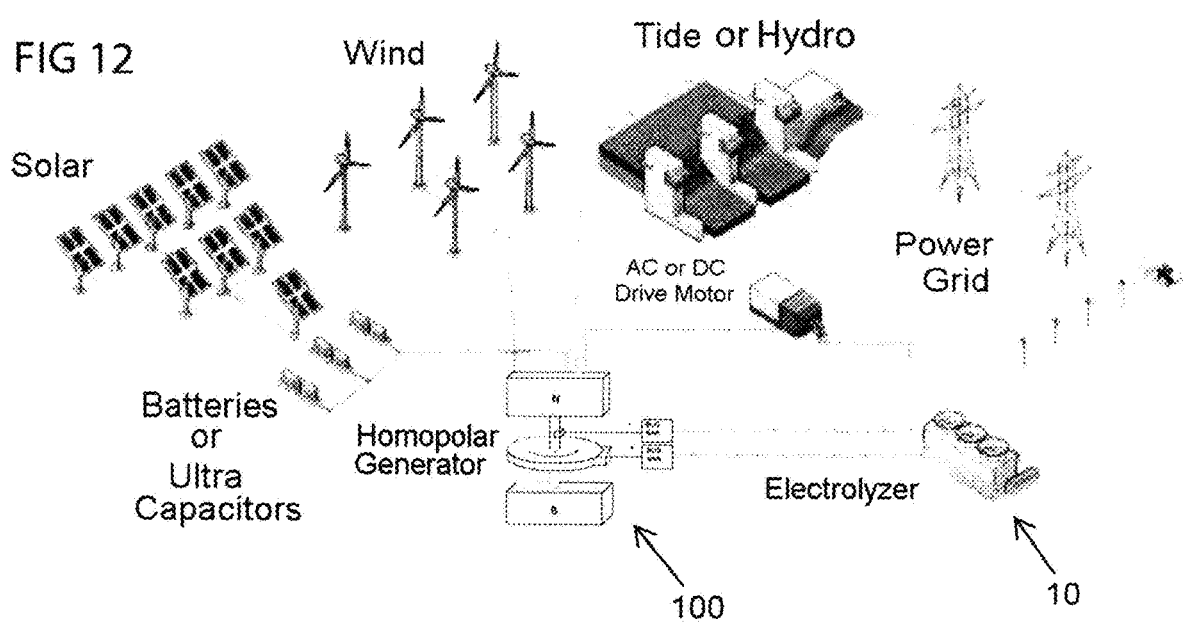
FIG. 12 is a diagram of various energy source to provide power for the series bipolar electrolyzer.

FIG. 12 is a pictorial diagram of various energy sources to provide power for the electrolysis process. The processes listed are tidal power, hydro power from rivers and waterfalls, windmills, and solar power. Additionally, battery cells and ultra capacitors can be arranged in a manner to be directly coupled to the bus terminals of the tank to regulate any power variations from the generator. Energy from wind, tidal, or hydro power stations can deliver mechanical energy to a homopolar generator through a hydrostatic transmission or through a conventional power transmission with accompanying gear boxes and linkages. The energy from these sources can also generate electricity through conventional generators to deliver power from an electric transmission line to the prime mover such as an AC motor connected to the homopolar generator. A solar power array of solar cells can supply energy to a battery bank for additional energy sources to aid the electrolysis process. FIG. 12 also discloses that the system can utilize the power grid when it is either necessary or convenient to supply power to the prime mover such as an AC motor connected to the homopolar generator.

The configurations shown in FIG. 12 can supply energy either collectively or independently to the unipolar electrolysis tank. The dry cell embodiment will work together collectively to provide the most efficient water electrolysis process as possible using the most efficient electrode materials, electrolytes, and membranes that are currently available. While the various embodiments of the unipolar electrolysis apparatus have been particularly shown and described with reference to a preferred embodiment thereof, it will be understood by those skilled in the art that changes in form and detail may be made therein without departing from the spirit and scope of the invention.

What is claimed is:

1. A unipolar electrolysis apparatus generating combustible hydrogen and oxygen from the electrolysis of water, said unipolar electrolysis apparatus comprising:
    an electrode plate assembly defining an equal number of a plurality of anode plates and cathode plates, aligned in parallel, in alternating order, and separated by a respective gasket, each said anode plate and cathode plate defining attachment holes which are aligned and attached together by insulated tubes and compressed together by two or more common threaded rods and tension nuts, each said anode plate and cathode plate defining a void fracture area and an extended area, with each extended area of each said anode plate forming a space and each extended area of each said cathode plate forming a space;
    a positive bus bar comprising a plurality of spaced laminated sheets, each said bus bar further defining one or more cable bores and end brackets retaining said plurality of spaced laminated sheets together using tensioning rods and tensioning nuts, said plurality of spaced laminated sheets of said positive bus bar accepting and integrating with said extending areas of said anode plates of said electrode plate assembly;
    a negative bus bar comprising a plurality of spaced laminated sheets, each said bus bar further defining one or more cable bores and end brackets retaining said plurality of spaced laminated sheets together using tensioning rods and tensioning nuts, said plurality of spaced laminated sheets of said negative bus bar accepting and integrating with said extending areas of said anode cathode of said electrode plate assembly;
    a plurality of electrical power cables transferring DC positive current from a DC power supply to said positive bus bar and DC negative current from said DC power supply to said negative bus bar providing electrical current generated by a DC power supply to each said plurality of anode plates and electrical current to each said plurality of cathode plates in water, thereby generating oxygen and hydrogen gasses from said void fracture areas from said water from said unipolar electrolysis apparatus during operation.

2. The unipolar electrolysis apparatus of claim 1 wherein said electrical power cables respectively receive said DC electrical positive and negative current from a homopolar generator.

3. The unipolar electrolysis apparatus of claim 1, further comprising said unipolar electrolysis apparatus is contained within a dry cell tank which provides said water within said dry cell tank and evacuates said generated hydrogen and oxygen gas to a respective external gas storage tank.

4. The unipolar electrolysis apparatus of claim 1 wherein said water includes a suitable electrolyte to enhance the production of hydrogen and oxygen gas.

5. The unipolar electrolysis apparatus of claim 1, wherein a geometry for said anode and cathode plates is shorter in height and longer in length.

6. The unipolar electrolysis apparatus of claim 1 further comprising said unipolar electrolysis apparatus is contained within a dry cell tank said dry cell tank further comprising a face plate defining a water inlet, a hydrogen gas outlet, an oxygen gas outlet and an end plate joined together by two or more tensioning rods and tensioning nuts, said dry cell being water tight and gas tight fully containing said water, said hydrogen gas and said oxygen gas except for the respective introduction of said water into said dry cell tank from an external water supply and controlled release of said hydrogen and oxygen gasses respectively from said dry cell to a respective external gas storage tank.

7. The unipolar electrolysis apparatus of claim 1 further comprising:
    a dry cell tank defining a face plate providing a water inlet, a hydrogen gas outlet, an oxygen gas outlet and an end plate joined together by two or more tensioning rods and tensioning nuts, said dry cell being water tight and gas tight fully containing said water, said hydrogen gas and said oxygen gas except for the respective introduction of said water into said dry cell tank from an external water supply and controlled release of said hydrogen and oxygen gasses respectively from said dry cell to a respective external gas storage tank; and
    said electrical power cables respectively receive said DC electrical positive and negative current from a homopolar generator.

8. The unipolar electrolysis apparatus of claim 1 further comprising:
    a dry cell tank defining a face plate providing a water inlet, a hydrogen gas outlet, an oxygen gas outlet and an end plate joined together by two or more tensioning rods and tensioning nuts, said dry cell being water tight and gas tight fully containing said water, said hydrogen gas and said oxygen gas except for the respective introduction of said water into said dry cell tank from an external water supply and controlled release of said hydrogen and oxygen gasses respectively from said dry cell to a respective external gas storage tank; and
    said water contains a suitable electrolyte to enhance the production of hydrogen and oxygen gas.

9. The unipolar electrolysis apparatus of claim 1 further comprising:
    a dry cell tank defining a face plate providing a water inlet, a hydrogen gas outlet, an oxygen gas outlet and an end plate joined together by two or more tensioning rods and tensioning nuts, said dry cell being water tight and gas tight fully containing said water, said hydrogen gas and said oxygen gas, except for the respective introduction of said water into said dry cell tank from an external water supply and controlled release of said hydrogen and oxygen gasses respectively from said dry cell to a respective external gas storage tank; and
    a geometry for said anode and cathode plates is shorter in height and longer in length.

* * * * *